United States Patent [19]

Ohno

[11] Patent Number: 4,561,810
[45] Date of Patent: Dec. 31, 1985

[54] BI-LEVEL CUTTING INSERT

[75] Inventor: John M. Ohno, Plymouth, Mich.

[73] Assignee: General Electric Company, Detroit, Mich.

[21] Appl. No.: 560,396

[22] Filed: Dec. 12, 1983

Related U.S. Application Data

[63] Continuation of Ser. No. 331,375, Dec. 16, 1981, abandoned.

[51] Int. Cl.[4] ............................................ B23B 27/14
[52] U.S. Cl. .................................. 407/118; 407/114; 51/307; 51/309; 76/101 R; 76/DIG. 12
[58] Field of Search ............... 407/113, 114, 118, 119; 408/144, 145; 51/307, 309; 76/101 R, 101 A, DIG. 12; 125/30 R, 39

[56] References Cited

U.S. PATENT DOCUMENTS

| | | | |
|---|---|---|---|
| 2,365,965 | 12/1944 | Littmann | 407/119 |
| 3,369,283 | 2/1968 | Colding | 407/119 |
| 3,487,514 | 1/1970 | O'Brien | 407/119 |
| 3,868,750 | 3/1975 | Ellis et al. | 407/119 |

FOREIGN PATENT DOCUMENTS

| | | | |
|---|---|---|---|
| 19461 | 11/1980 | European Pat. Off. | 407/118 |
| 140284 | 10/1979 | Japan | 407/119 |
| 2086640 | 5/1982 | United Kingdom | 408/144 |

Primary Examiner—Leonidas Vlachos
Assistant Examiner—Jerry Kearns
Attorney, Agent, or Firm—Hedman, Gibson, Costigan, & Hoare

[57] ABSTRACT

A cutting insert is provided with a core having upper and lower surfaces and a recess in the upper surface. Crystal portions containing a dispersion of super-hard crystals are disposed at predetermined locations on the periphery of the upper surface of the core outside of the recess, and a layer of metal is bonded to the upper surface of the core inside the recess. The layer of metal extends upwardly beyond the upper surface. The layer of metal is provided to produce highly parallel upper and lower surfaces of the cutting insert in order to facilitate the mounting of the insert into a cutting body. The layer of metal further functions to absorb shock during a cutting operation.

9 Claims, 5 Drawing Figures

U.S. Patent  Dec. 31, 1985  4,561,810
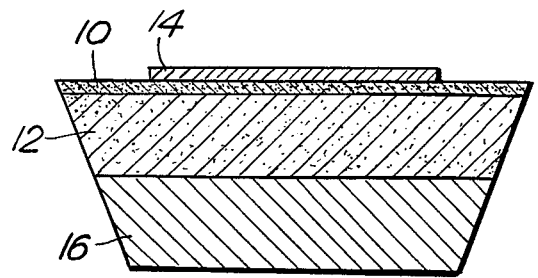
FIG. 1
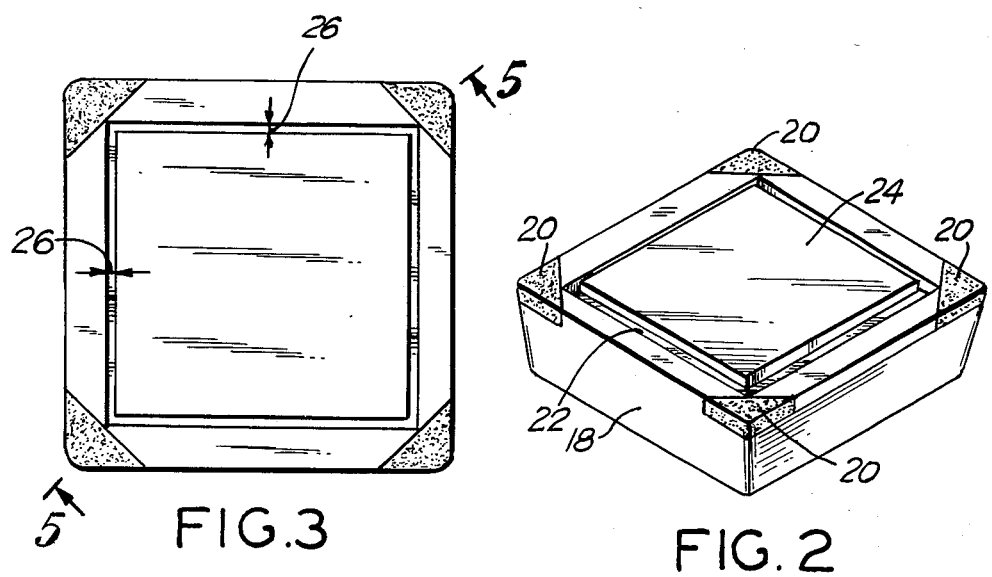
FIG. 3
FIG. 2
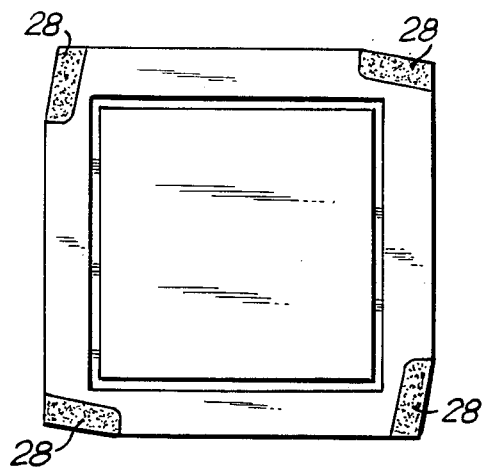
FIG. 4
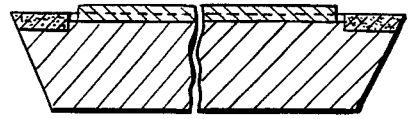
FIG. 5

BI-LEVEL CUTTING INSERT

This is a continuation of application Ser. No. 331,275 filed Dec. 16, 1981, now abandoned.

BACKGROUND OF THE INVENTION

Articles composed of materials having refractory characteristics, such as hardness and resistance to erosion may be used as cutting inserts in the fields of metal machining, such as boring, drilling and the like. Representative materials are described in U.S. Pat. No. 2,938,807 to Anderson.

Such materials must be tough, wear-resistant, capable of high temperature operation, and must be shock resistant to prevent chipping or cracking. In operation, a cutting insert is placed in a tool holder, or a milling cutter body, and clamped tightly. Since the clamp or wedge is hardened, the clamped surfaces of the cutting insert must be parallel and well finished. Any stress concentration due to non-uniform surfaces may cause cracking of the insert during machining operations.

U.S. Pat. No. 4,219,339 to Wilson discloses a diamond insert onto which two rigid materials are brazed to cover both surfaces of the insert. The rigid material brazed on the top of the diamond insert does not provide any shock aborbing function to prevent chipping of the diamond during a cutting operation, however. Further, in order to braze the rigid metal to the diamond material, the surface of the diamond must be ground to perfect parallelism, requiring an inordinate amount of time and expense. Still further, the cutting insert disclosed in U.S. Pat. No. 4,219,339 is not indexable.

Another technique for facilitating the clamping of a cutting insert into a cutting tool is provided in commercially available diamond COMPAX ®, produced by the assignee of the present invention. A polycrystalline diamond body is liquid phase sintered onto a carbide substrate of high cobalt content to produce a blank. The blank is then finished and brazed onto a pocket in a tungsten carbide insert of standard thickness and parallelism. Only one pocket is provided on the insert and is therefore not indexable. Further, the polycrystalline diamond material is made by a high temperature high pressure process which is expensive and time consuming.

A technique for producing a polycrystalline composite for use in a cutting insert is described in co-pending U.S. patent application Ser. Nos. 167,019 and 167,196, both filed July 9, 1980, both by Dr. John M. Ohno, and assigned to the assignee of the present invention, the entire disclosures of which are hereby incorporated by reference. In these applications, a straightforward technique (hereinafter referred to as "press and treat technique") for forming high quality cutting inserts having cutting surfaces at a plurality of locations, yet which readily lends itself to mass production is disclosed. Very briefly, the press and treat technique involves the preparation of a first dispersion of super-hard crystals such as diamond or cubic boron nitride crystals in carbon black, and a second dispersion of carbon black, carbon fiber and filler material. The two dispersions are individually mixed with a temporary binder such as paraffin to lend a sufficient green strength to the two dispersions upon cold compaction thereof. After compacting the two dispersions together in a configuration which provides a plurality of cutting edges on the insert, the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a matrix of $\beta$-silicon carbide and silicon which bonds both dispersions both internally and to each other.

In co-pending U.S. patent application Ser. No. 226,603, filed Jan. 21, 1981, by Dr. John M. Ohno, and assigned to the assignee of the present invention, the entire disclosure of which is hereby incorporated by reference, an indexable, sandwiched multi-layer composite cutting insert is described and is shown herein in FIG. 1. The reaction sintered layers 10 and 12 produced by the above-mentioned press and treat technique are sandwiched by an aluminum or copper metal sheet 14 bonded to the top of crystal layer 10 and a metal carbide substrate 16 bonded to the bottom of core layer 12. The insert produced in accordance with Ser. No. 226,603, although having substantially perfect parallelism, produces an insert which is thicker than standard, and thus requires special mounting devices on the tool holder.

Another co-pending U.S. patent application Ser. No. 331,379, filed Dec. 16, 1981, by Dr. John M. Ohno, filed concurrently herewith and assigned to the assignee of the present invention, the entire disclosure of which is incorporated by reference, describes a multi-layer composite similar to that produced in accordance with Ser. No. 226,603, except for the particular configuration of the reaction sintered layers, carbide substrate and metallic top plate.

Still a further technique of simplifying the task of providing highly parallel surfaces for the cutting insert is disclosed in co-pending U.S. patent application Ser. No. 331,365, filed Dec. 16, 1981, by Dr. John M. Ohno, filed concurrently herewith and assigned to the assignee of the present invention, the entire disclosure of which is also incorporated by reference, wherein a polygonal cutting insert having a plurality of super-hard crystal cutting surfaces disposed exclusively at the corners of the polygonal insert, is disclosed. The super-hard crystal portions at the corners of the insert are elevated relative to the central portion of the insert, only the elevated portions of the composite coming into contact with the tool holder, clamp, thus reducing the amount of material which must be machined to provide parallelism.

SUMMARY OF THE INVENTION

It is an object of the invention to provide a cutting insert which may be quickly and economically provided with parallel opposing surfaces.

It is a further object of the invention to provide a cutting insert having reduced finishing costs.

It is a further object of the invention to provide a cutting insert which reduces stress concentration during tightening of a cutting tool, and increases shock absorption capability during cutting operations.

The cutting insert in accordance with the present invention includes a core having upper and lower surfaces and a recess in the upper surface, crystal portions containing a dispersion of super-hard crystals disposed at predetermined locations on the periphery of the upper surface of the core outside of the recess, and a layer of metal bonded to the upper surface of the core inside the recess and extending beyond the upper surface.

More specifically, the upper and lower surfaces of the core and the upper surface of the layer of metal are substantially parallel, the upper surface of the layer of metal extending approximately 0.008 inches beyond the upper surface of the core. Ideally, the shape of the recess is approximately the same as the shape of the core. The core may have a polygonal shape, the crystal portions being disposed exclusively at the top side edges or corners of the core defined by its polygonal shape depending on the operation. If desired, the crystal portions may be non-symmetrically disposed in the corner portions to thereby minimize the amount of super-hard crystals disposed therein.

In accordance with the preferred embodiment of the invention, the crystal portions are bonded to the core by a matrix of β-silicon carbide and silicon, and the layer of metal is comprised of a layer of soft metal or metal alloy such as Al, Cu, Ag-Cu alloy, Al alloy or Cu alloy. Finally, the combination of the core crystal portions and the layer of metal exclusively combine to form a cutting insert at least approximately ⅛ inch thick or 3/16 inch thick.

BRIEF DESCRIPTION OF THE DRAWINGS

These and other objects and embodiments of the invention will now be described with further reference to the following drawing figures of which:

FIG. 1 is a side view of an insert produced in accordance with co-pending U.S. patent application Ser. No. 226,603;

FIG. 2 is a perspective view of a particular embodiment of a cutting insert produced in accordance with the present invention;

FIG. 3 is a top view of the insert illustrated in FIG. 2;

FIG. 4 is a top view of an alternative embodiment of the insert produced in accordance with the present invention; and FIG. 5 is a cross-section view of the insert illustrated in FIG. 3.

DETAILED DESCRIPTION OF THE INVENTION

With reference to FIGS. 2, 3 and 5, the cutting insert in accordance with the present invention comprises the reaction sintered composite produced in accordance with the press and treat technique described above, including core 18 comprising a dispersion of carbon fiber and filler material in a matrix of β-silicon carbide and silicon, and crystal portions 20 comprising a dispersion of super-hard crystals, such as diamond or cubic boron nitride crystals in a matrix of β-silicon carbide and silicon. Core 18 is generally square in shape and crystal portions 20 are disposed exclusively at the corners of core 18 at the upper surface thereof. However, it will be readily apparent to one skilled in the art that the present invention can be employed in conjunction with any of the other configurations described in the above-mentioned co-pending patent applications, including circular and triangular cores, having crystal portions at various locations about the periphery of the upper surface of the core.

When the composite comprising core 18 and crystal portions 20 is compacted during the press and treat process, the top surface of core 18 is provided with indentation 22 having the same general shape as core 18 and an approximate depth of 0.008 inches. A soft metal or alloy later, such as Al, Cu, Ag-Cu alloy, Al alloy or Cu alloy, is adhesively bonded to core 18 within recess 22. The layer 24 has a typical thickness of 0.02 inches as best seen in FIG. 5, the top surface of layer 24 being slightly elevated relative to the top surface of core 18 by approximately 0.008 inches. The outer dimensions of layer 24 are slightly less than the inner dimensions of recess 22 to thereby provide a small clearance 26 between layer 24 and the side walls of recess 22, as best illustrated in FIG. 3.

FIG. 4 illustrates an alternative embodiment of the present invention wherein the recess 22 and layer 24 are provided in an insert configured with non-symmetrical crystal portions 28, as more fully disclosed in co-pending patent application Ser. No. 331,366, filed Dec. 16, 1981, by Dr. John M. Ohno, concurrently filed herewith and assigned to the assignee of the present invention, the entire disclosure of which is hereby incorporated by reference.

In accordance with the present invention, the core 18 may be made to a thickness of approximately ⅛ to 3/16 inch, as disclosed in co-pending U.S. patent application Ser. No. 331,380, filed Dec. 16, 1981, by Dr. John M. Ohno, filed concurrently herewith and assigned to the assignee of the present invention, the entire disclosure of which is hereby incorporated by reference, thereby obviating the need for bonding the composite onto a tungsten carbide substrate, the cost of the insert is accordingly reduced, since tungsten carbide inserts involve the use of scarce and expensive cobalt and tantalum carbide.

Parallelism of the top surface of layer 24 and the bottom surface of core 18 is easily provided since any required adjustment to the thickness of the soft metal layer is much easier than grinding a diamond top layer. Further, use of the soft metal layer 24 significantly reduces any stress concentration imparted to the insert during tightening thereof in a milling cutter body or a tool holder. Layer 24 further provides an increase in shock absorption capability during cutting operations, and also acts to dissipate thermal energy.

Unlike the insert disclosed in pending U.S. patent application Ser. No. 226,603, the insert produced in accordance with the invention may be of standard thickness, thus usable with standard tool holders. Also, the core 18 and crystal portions 20 may be produced using a minimum amount of expensive crystal material in accordance with the efficient and inexpensive press and treat technique.

Although the preferred embodiments and examples of the present invention have been described with reference to the foregoing specification and drawings, the scope of the invention shall now be defined with reference to the following claims.

What is claimed is:

1. A cutting insert usable with standard tool holders comprising:

a core having upper and lower surfaces and an indentation within its upper surface which forms a recess therewithin;

crystal portions containing a dispersion of super-hard crystals disposed at pre-determined locations on the periphery of said upper surface outside of said recess; and a layer of soft metal or metal alloy bonded to said upper surface inside said recess and upwardly extending beyond said upper surface, said recess being bounded by walls, and wherein there is a clearance between said layer and said walls, wherein said soft metal or metal alloy is easier to machine than said core and dispersion of super-hard crystals, to thereby readily provide parallelism between said upper and lower surfaces.

2. The cutting insert of claim 1 wherein said upper and lower surfaces of said core and the upper surface of said layer of metal are substantially parallel.

3. The cutting insert of claim 2 wherein said upper surface of said layer of metal extends approximately 0.008 inches beyond said upper surface of said core.

4. The cutting insert of claim 2 wherein the shape of said recess is approximately the same as the shape of said core.

5. The cutting insert of claim 4 wherein said core has a generally polygonal shape, and said crystal portions are disposed exclusively at peripheral edges or corners defined by said polygonal shape.

6. The cutting insert of claim 5 wherein said crystal portions are non-symmetrically disposed in said corner portions to thereby minimize the amount of super-hard crystals disposed therein.

7. The cutting insert of claim 4 wherein said crystal portions are bonded to said core by a matrix of $\beta$-silicon carbide and silicon.

8. The cutting insert of any one of claims 1–7 wherein the combination of said core, said crystal portions, and said layer of metal exclusively combine to form a cutting insert at least approximately $\frac{1}{8}$ inch thick.

9. The cutting insert of claim 8 wherein said soft metal or metal alloy is selected from the group consisting of Al, Cu, Ag-Cu alloy, Al alloys or Cu alloy.

* * * * *